US012049857B2

(12) United States Patent
Hembury et al.

(10) Patent No.: US 12,049,857 B2
(45) **Date of Patent: *Jul. 30, 2024**

(54) INJECTOR CUP FOR ENGINES APPARATUS AND METHODS OF USE

(71) Applicant: Industrial Injection Services, Inc., Salt Lake City, UT (US)

(72) Inventors: Dustin S. Hembury, Elsinore, UT (US); Randall P. Farmer, Annabella, UT (US); Cody Q. Lamb, Monroe, UT (US); Bryton S. Williams, Annabella, UT (US); Shane B. Williams, Riverton, UT (US)

(73) Assignee: Industrial Injection Services, Inc., Salt Lake City, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/071,301

(22) Filed: Nov. 29, 2022

(65) Prior Publication Data

US 2023/0118673 A1 Apr. 20, 2023

Related U.S. Application Data

(62) Division of application No. 17/700,126, filed on Mar. 21, 2022, now Pat. No. 11,519,371.

(60) Provisional application No. 63/164,253, filed on Mar. 22, 2021.

(51) Int. Cl.

| | |
|---|---|
| ***F02M 53/00*** | (2006.01) |
| ***F02M 53/04*** | (2006.01) |
| ***F02M 55/00*** | (2006.01) |
| ***F02M 61/14*** | (2006.01) |
| ***F02M 61/16*** | (2006.01) |

(52) U.S. Cl.
CPC ........ *F02M 55/004* (2013.01); *F02M 53/043* (2013.01); *F02M 61/14* (2013.01); *F02M 61/168* (2013.01); *F02M 2200/16* (2013.01); *F02M 2200/8076* (2013.01); *F02M 2200/858* (2013.01)

(58) Field of Classification Search
CPC .... F02M 53/043; F02M 55/004; F02M 61/14; F02M 61/168; F02M 2200/16; F02M 2200/8076; F02M 2200/858
USPC ......... 123/470; 29/888.011, 888.06, 888.061
See application file for complete search history.

(56) References Cited

U.S. PATENT DOCUMENTS

| | | | | |
|---|---|---|---|---|
| 5,090,102 A | | 2/1992 | Lovell | |
| 5,094,215 A | | 3/1992 | Gustafson | |
| 5,345,913 A | * | 9/1994 | Belshaw | F02M 61/14 123/470 |
| 5,765,282 A | | 6/1998 | Sweetland et al. | |
| 5,784,783 A | | 7/1998 | Carpenter | |
| 7,861,692 B2 | | 1/2011 | Biasci et al. | |

(Continued)

FOREIGN PATENT DOCUMENTS

| | | | | |
|---|---|---|---|---|
| KR | 2009051565 A | * | 5/2009 | F02M 61/14 |
| WO | WO2013086427 A1 | | 6/2013 | |

*Primary Examiner* — Erick R Solis
(74) *Attorney, Agent, or Firm* — Pate Nelson & Hill, PLLC

(57) ABSTRACT

An improved injector cup may be used in diesel engines that fits more securely into the engine's cylinder heads to better prevent engine coolant from leaking into the fuel and/or fuel leaking into the coolant. An improved injector cup may be designed to accommodate specific engine types and sizes in order to prevent engine coolant from leaking into the fuel and/or fuel leaking into the coolant.

18 Claims, 9 Drawing Sheets

SECTION B-B

(56) References Cited

U.S. PATENT DOCUMENTS

| | | | |
|---|---|---|---|
| 7,966,900 | B2 | 6/2011 | Becker et al. |
| 8,590,505 | B2 | 11/2013 | Simmons et al. |
| 8,875,682 | B2 | 11/2014 | Di Domizio et al. |
| 9,103,308 | B2 | 8/2015 | Serra et al. |
| 9,194,307 | B2 | 11/2015 | Geckler et al. |
| 9,410,490 | B2 | 8/2016 | Kolhouse et al. |
| 9,528,485 | B2 | 12/2016 | Serra et al. |
| 9,718,156 | B2 | 8/2017 | Whitaker |
| 9,976,530 | B2 | 5/2018 | Shaw |
| 9,988,999 | B2 | 6/2018 | Ancimer et al. |
| 10,161,325 | B2 | 12/2018 | Zur Loye et al. |
| 10,471,554 | B2 | 11/2019 | Graham et al. |
| 11,067,014 | B2 | 7/2021 | Dane et al. |
| 2008/0216608 | A1 * | 9/2008 | Schuchardt ........... B25B 27/062 81/52 |
| 2010/0258085 | A1 | 10/2010 | Giorgetti et al. |
| 2011/0277721 | A1 | 11/2011 | Baker et al. |
| 2017/0204797 | A1 | 7/2017 | Geckler et al. |
| 2017/0363054 | A1 | 12/2017 | Pickard et al. |
| 2023/0012000 | A1 * | 1/2023 | Heher .................... F02M 61/16 |

* cited by examiner

INJECTOR CUP FOR ENGINES APPARATUS AND METHODS OF USE

RELATED APPLICATIONS

This application: is a continuation of U.S. patent application Ser. No. 17/700,126, filed Mar. 22, 2022, scheduled to issue as U.S. Pat. No. 11,519,371 on Dec. 6, 2022, which claims the benefit of U.S. Provisional Patent Application Ser. No. 63/164,253, filed on Mar. 22, 2021, which is hereby incorporated by reference in its entirety.

BACKGROUND

The Field of the Invention

This invention relates to an improved injector cup product or component for use in diesel internal combustion engines, and more particularly, a torque lock injector cup for keeping coolant from leaking within and/or from the cylinder head and the appropriate tools for modifying the engine and installing the injector cup product.

Background

Generally, an injector cup is found within a cylinder head in a diesel engine. The injector cup seals the cooling system from the injector inside the cylinder head. If an injector cup fails, there will no longer be a seal between the diesel engine's fuel and coolant systems. A common problem with certain models of diesel engines is that factory-installed injector cups may allow coolant to leak within and/or from the cylinder head, thus allowing coolant to mix with fuel.

A factory injector cup is generally seated into, or pressed into, the bottom of a cylinder head. A coolant chamber, or jacket, or passage, is between the factory injector cup and the cylinder head. The factory injector cup is surrounded by coolant that is usually contained within the coolant chamber, or jacket.

For example, the factory injector cup for a SOHC engine does not generally thread at the bottom; the factory injector cup is basically pressed into the cylinder head and the factory injector cup develops a ridge along the outside where the factory injector cup is pressing against the cylinder head. The factory injector cup has one O-ring. Once the factory injector cup is distorted into the cylinder head, it is just a press fit. Then a collar goes inside the factory injector cup that presses out on the bottom of the factory injector cup. The injector goes through the factory injector cup and seats with a copper at the bottom of the head. The injector never touches the factory injector cup. All the factory injector cup does is serve as a sleeve separating the coolant from the fuel. Thus, when the head starts heating, twisting, distorting, changing shapes or forms, the factory injector cup will essentially be "floating" in the cylinder head. This is a primary reason for the coolant leaking past the factory injector cup and into the fuel.

A factory injector cup usually has an O-ring, or dust shield, around the outer surface of the injector cup to prevent leakage of coolant. This O-ring may be very near the edge of where the factory injector cup fits in the cylinder head, which can result in an inadequate seal. If the O-ring, or dust shield, does not seal adequately, or if there is not enough O-ring, then coolant may be able to escape past the factory injector cup and into the fuel. The coolant is under pressure and there is more pressure on the coolant side than on the fuel side of the factory injector cup. The result is that coolant is more likely to leak past the factory injector cup and get into the fuel.

For example, there are two slightly different injector cups for the Cummins™ engine Model ISX. There is one type of injector cups for the earlier models (2001-2009), which include a dual overhead cam engine (DOHC). There is another type of injector cups for the later models (2010-2016), which include a single overhead cam engine (SOHC). There is also an installation tool to center and torque the injector cups. The tool is universal and can be used to install both injector cup designs.

It would be an improvement to provide an improved injector cup apparatus and method for keeping coolant from leaking into the cylinders of these engines.

BRIEF SUMMARY OF THE INVENTION

In accordance with the foregoing, certain embodiments of an improved injector cup product or component, accompanying tools, and methods for production and use in accordance with the invention are described.

An improved injector cup may be designed and/or modified to provide an improved installation of the injector cup to help prevent coolant from getting into an engine's cylinders. In one embodiment, an improved injector cup may include at least two O-rings. A first O-ring may be included near the edge of where the injector cup fits in the cylinder head, and a second O-ring may be included further into the cylinder head and toward the top rim of the injector cup. This double O-ring configuration may provide an improved seal between the injector cup and the coolant chamber.

In one embodiment, an improved injector cup may be lengthened to allow multiple O-rings at the top of the injector cup to seal better within the cylinder head, further into the cylinder head, and further away from the edge of the coolant chamber, or coolant jacket. Thus, lengthening the body, or barrel, of the injector cup may help improve the seal provided by the injector cup.

In one embodiment, the barrel of an improved injector cup may be tapered, or may include a conical section, which can allow for added space within the coolant chamber, or coolant jacket, but the remaining, non-tapered structure of the injector cup can still provide the improved sealing of the coolant chamber. Thus, a modified shape of an improved injector cup can provide multiple benefits resulting from improved sealing capabilities.

In one embodiment, an improved injector cup may be threaded at the bottom, and the bottom of the cylinder may be tapped, so that the improved injector cup threads in at the bottom of the cylinder and is more securely positioned. Such a securement of the injector cup can prevent the injector cup from "floating," or allowing not insignificant movement, of the injector cup within the cylinder head. This "floating" contributes to coolant leaking past a loose injector cup and into the fuel. Thus, the securing of the improved injector cup can also help prevent coolant from leaking past the improved injector cup. The tolerances of an improved injector cup may be smaller so that the injector cup seats in the cylinder head more securely.

In one embodiment, a unique torque lock tool, or torque tool, may be designed to connect with an improved injector cup to improve installation of the improved injector cup. For example and without limitation, an improved injector cup may be torqued into a cylinder head at a certain specification, i.e., sixty-five (65) foot-pounds of torque. This may create an improved hold at the bottom of the injector cup, which may allow for more sealing surface area at the top of the injector cup where the multiple O-rings may be placed.

One or more of these features of an improved injector cup allow the improved injector cup to better protect against coolant leaking into the fuel. The improved injector cup improves the way the coolant is sealed from the fuel.

A method for preventing leakage of coolant into the fuel of a diesel engine may comprise the following steps. An improved injector cup may be provided, wherein the injector cup may comprise threads at a distal end, and may comprise at least two O-rings near a proximal end, and may comprise a conical portion near the distal end of the injector cup, and may comprise a plurality of cavities near the proximal end of the injector cup.

The injector cup may be inserted into an injector cavity bore of a cylinder head of a diesel engine, wherein the cylinder head comprises insertion threads in a fire deck side of the cylinder head, or in the bottom of the cylinder head.

A torque tool may be provided having a plurality of prongs at one end, wherein the plurality of prongs are configured to engage the plurality of cavities in the injector cup. The plurality of prongs may be inserted into the plurality of cavities.

The threads of the injector cup may be properly engaged with the insertion threads in the cylinder head. The injector cup may be tightened into the fire deck side of the cylinder head, or the bottom of the cylinder head, via the engagement between the insertion threads and the threads of the injector cup in a manner that prevents floating of the injector cup within the cylinder head and in a manner that enables the O-rings to engage an injector cavity wall. A seal may be created between the injector cavity bore and a coolant chamber, wherein the seal is created by the engagement of the O-rings with the injector cavity wall. A recession may be cut into the injector cup to allow for a plug.

The improved injector cup may have a barrel that has a length that places all O-rings above the coolant chamber and within the injector cavity bore such that the O-ring nearest the coolant chamber is at least 0.05 inches above the coolant chamber.

The injector cup may be tightened into the cylinder head to achieve at least, or approximately, sixty-five (65) foot-pounds of torque.

BRIEF DESCRIPTION OF THE DRAWINGS

The foregoing features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF THE PREFERRED EMBODIMENTS

It will be readily understood that the components of the present invention, as generally described herein, could be arranged and designed in a wide variety of different configurations or formulations. Thus, the following more detailed description of the embodiments of the system, products and methods of use of the present invention, are not intended to limit the scope of the invention, as claimed, but is merely representative of various embodiments of the invention.

An improved injector cup component or product may be used to seat a cylinder head in a manner that better prevents coolant from leaking into an engine's cylinder and/or fuel system. Such an injector cup component replaces a similar device, but the new, improved injector may be designed and installed to have improved seal and retention.

Figure 1:
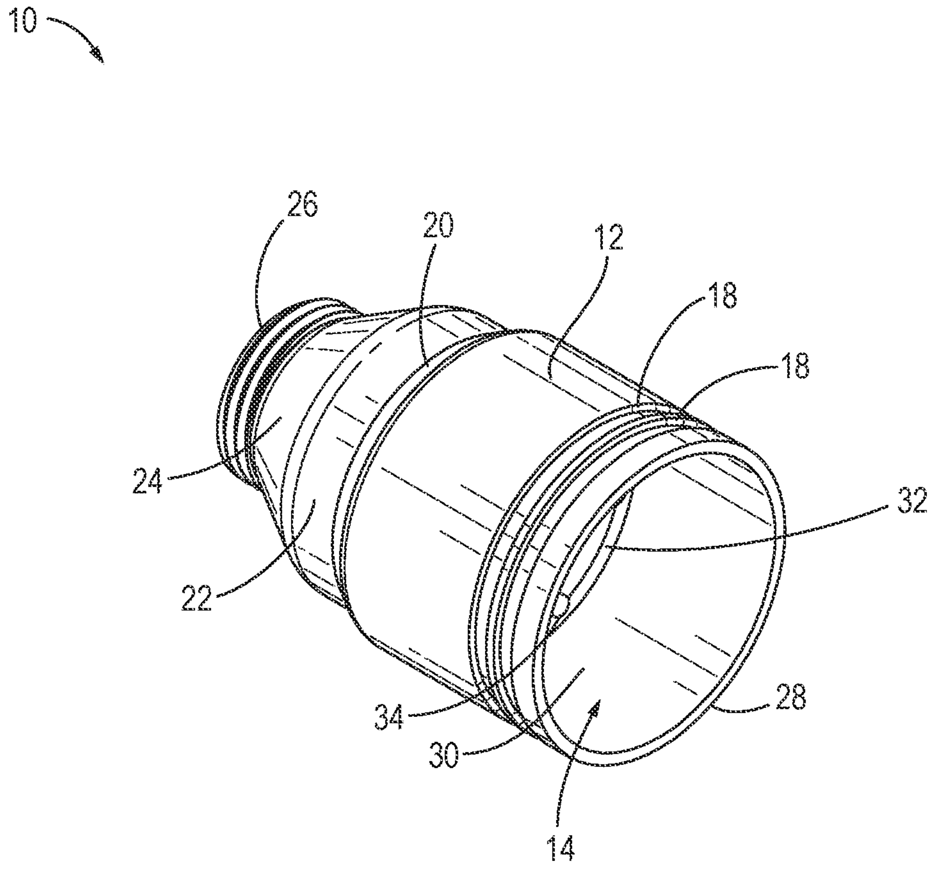
FIG. 1 is a perspective view of one embodiment of an injector cup.
Figure 2A:
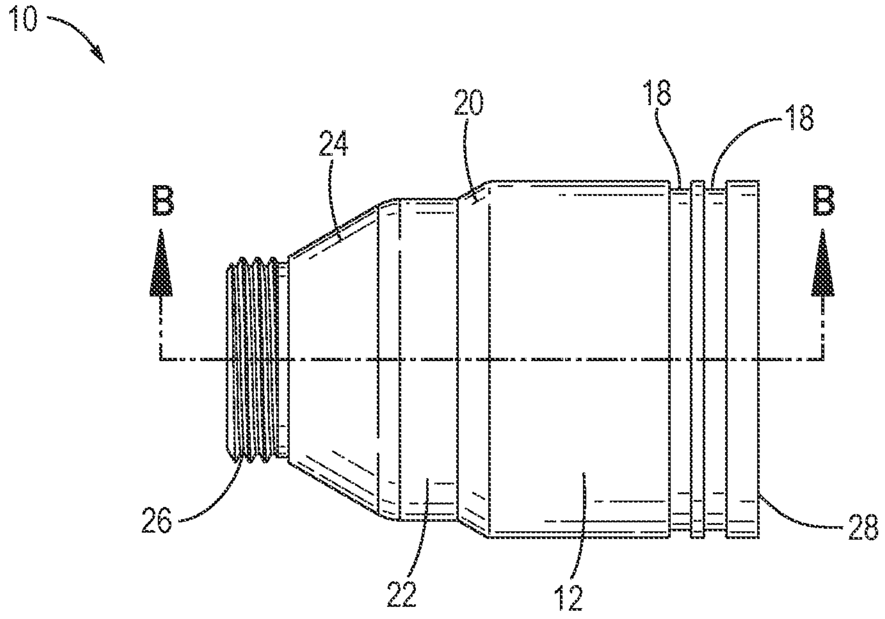
FIG. 2A is a side view of one embodiment of an injector cup.
Figure 2B:
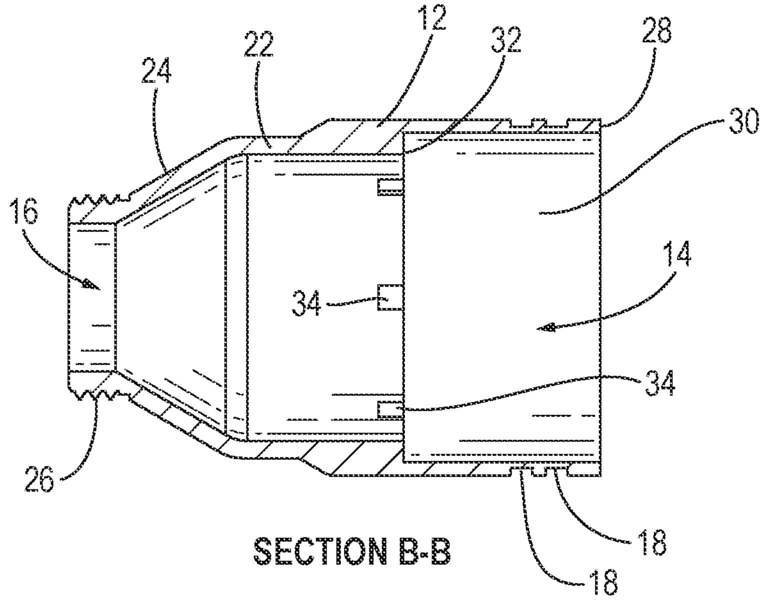
FIG. 2B is a cut-away side view of one embodiment of an injector cup.
Figure 3A:
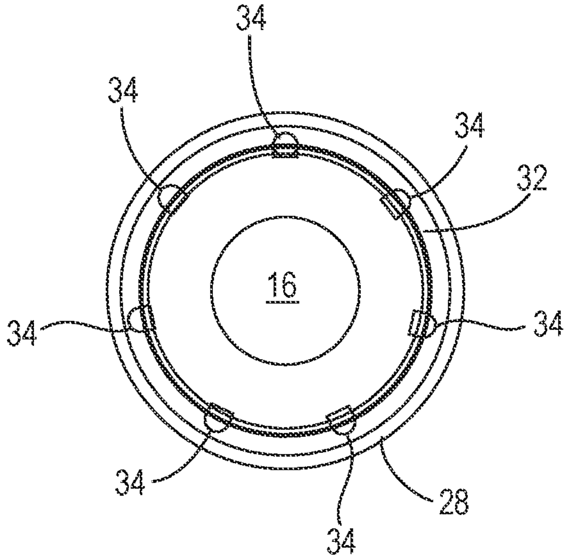
FIG. 3A is a top plan view of one embodiment of an injector cup.
Figure 3B:
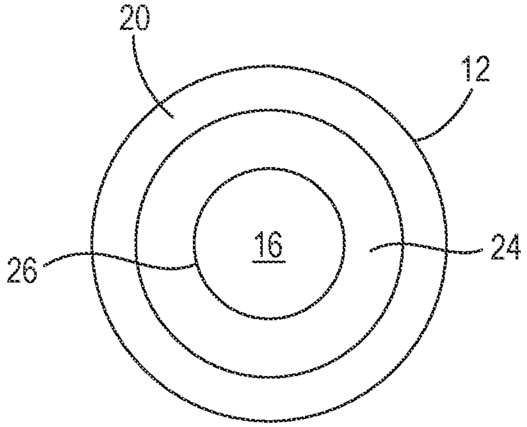
FIG. 3B is a bottom plan view of one embodiment of an injector cup.

Referring to FIGS. 1-3, and notably FIG. 1, an improved injector cup 10 may be designed more particularly for use in a DOHC engine. An improved injector cup 10 may include a barrel 12, a tapered surface 20, a pipe 22 (or pipe surface 22), a conical portion 24 (or conical surface 24), and threads 26. An improved injector cup 10 may be described as having a proximal end and a distal end. The proximal end may include a rim 28, which rim 28 defines a proximal aperture 14. The distal end may include threads 26, which threads 26 define a distal aperture 16. An O-ring groove 18 may be included along the outside of the barrel 12 near the proximal end of the injector cup 10. More likely, two or more O-ring grooves 18 may be included along the outside of the barrel 12 near the proximal end of the injector cup 10.

Generally, an improved injector cup 10 may be made of stainless steel, but any suitable material may be used to form the injector cup 10. An O-ring may be a dual silicone O-ring, but any suitable material may be used to form an O-ring. An O-ring may be comprised of a material that can withstand temperatures of at least 450° F. Upon installation of an injector cup 10, each O-ring groove 18 that is on the barrel 12 will include a suitable O-ring within the O-ring groove 18.

Referring to FIGS. 1-3, and notably FIG. 2A, the barrel 12 and/or pipe portion 22 of an injector cup 10 may be any suitable length. An overall length of the injector cup 10 should allow for all O-rings to connect with and seal against the bore of an injector cavity 52, or against the injector cavity wall 54, of the cylinder head 50 in which the injector cup 10 is installed. An example of an overall length of the injector cup 10 would be 2.05 inches. An example of the length of the barrel 12 would be 0.68 inches. The injector cup 10 may have a barrel 12 that has a length that places all O-rings above the coolant chamber 56 and within the injector cavity bore 52 such that the O-ring nearest the coolant chamber 56 is at least 0.05 inches above the coolant chamber 56. An example of the outer diameter of the barrel 12, and ring 28, would be 1.38 inches. An example of the diameter of the proximal aperture 14 would be 1.27 inches. An example of the diameter of the distal aperture 16 would be 0.57 inches.

Referring to FIGS. 1-3, and notably FIG. 3A, an improved injector cup 10 may include an inner annulus 32 inside the barrel 12 portion of the injector cup 10. The inner annulus 32 may include multiple cavities 34, or a plurality of cavities 34. The cavities 34 may be configured to receive prongs 78 from a torque tool 70. The cavities 34 may be arranged in any suitable configuration around the inner annulus 32 to enable engagement with a suitable torque tool 70. An example of the inner diameter of the inner annulus 32 would be 1.11 inches.

Figure 4:
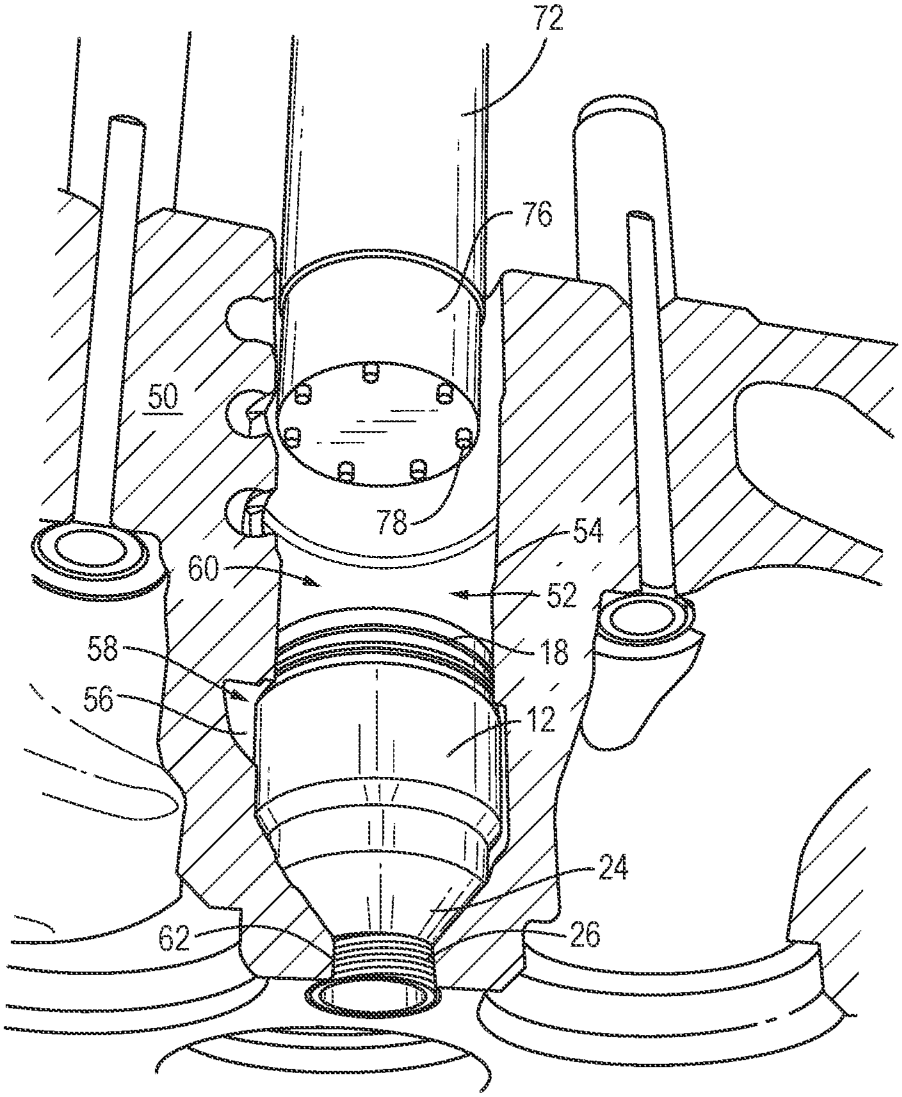
FIG. 4 is a perspective view of one embodiment of an injector cup as installed in a cylinder head.

Referring to FIG. 4, an improved injector cup 10 may be installed into a bore of an injector cavity 52 of a cylinder head 50, or engine 50. The injector cup 10 may secured to the bottom of the cylinder 62, or the cup seat 62, via the threads 26. The bottom of the cylinder head 62, or cup seat 62, may need to be tapped, or have an internal screw thread cut therein, to engage with the threads 26. Installation of the improved injector cup 10 may be accomplished using a torque tool 70 where the body 72 of the torque tool 70, and the tube 76 of the torque tool 70, may extend into the bore of an injector cavity 52 to allow the prongs 78 of the torque tool 70 to engage the cavities 34 of the injector cup 10. Once the prongs 78 are engaged with the cavities 34, the torque tool 70 can be used to tighten the injector cup 10 into place within the cylinder head 52.

Once the injector cup 10 is secured into place, O-rings positioned in O-ring grooves 18 will engage or contact the injector cavity wall 54. This will effectively seal the fuel side 60 of the configuration from the coolant side 58. Coolant in the coolant chamber 56 will be prevented from leaking into the fuel and/or fuel will be prevented from leaking into the coolant chamber 56.

Figure 5:
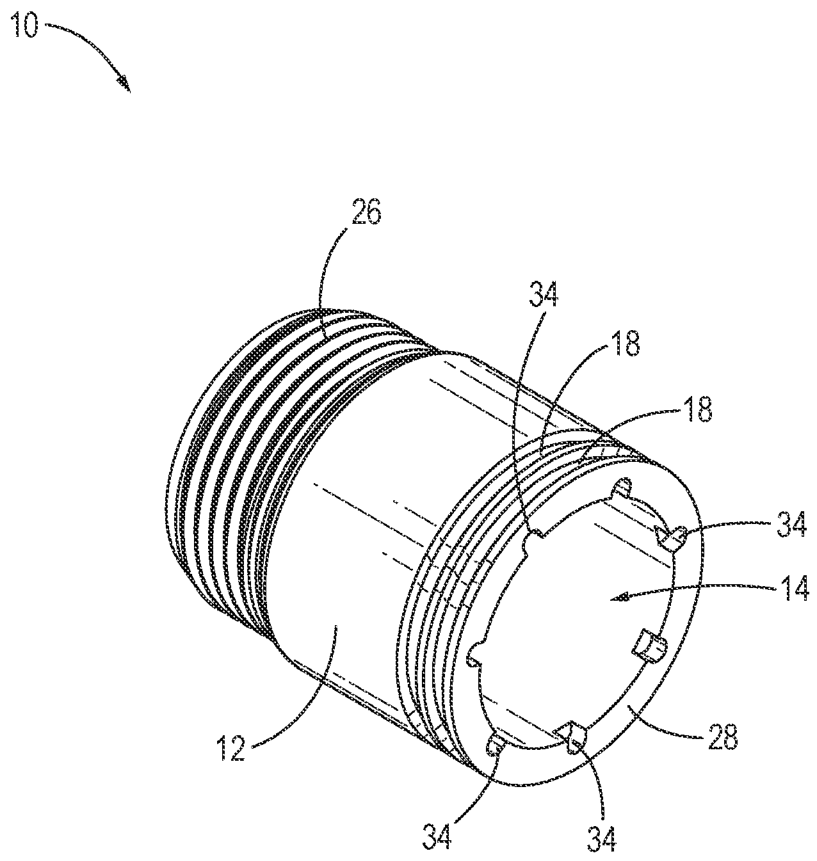
FIG. 5 is a perspective view of another embodiment of an injector cup.
Figure 6A:
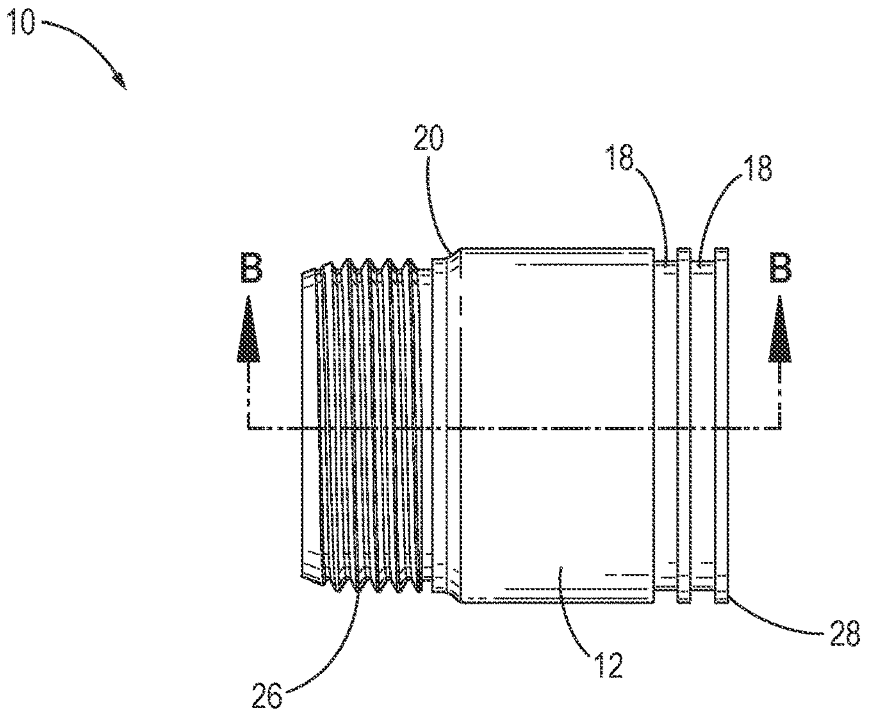
FIG. 6A is a side view of another embodiment of an injector cup.
Figure 6B:
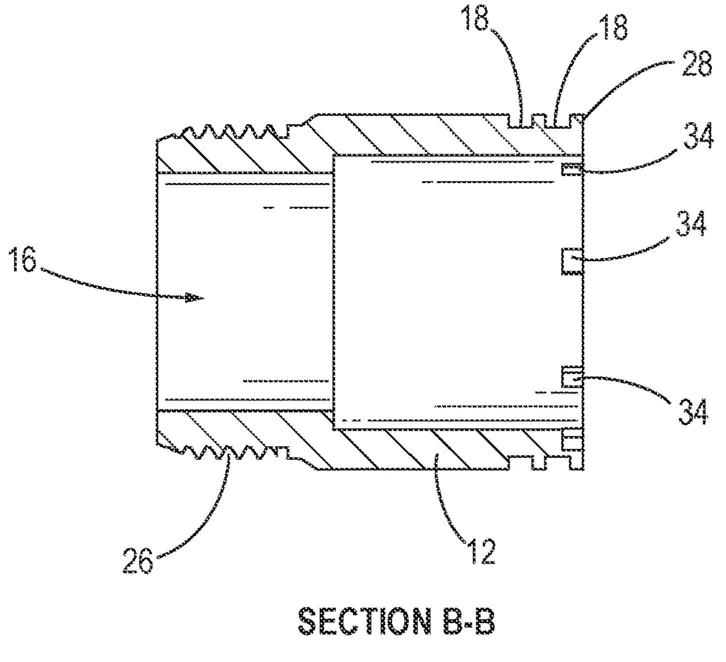
FIG. 6B is a cut-away side view of another embodiment of an injector cup.
Figure 7A:
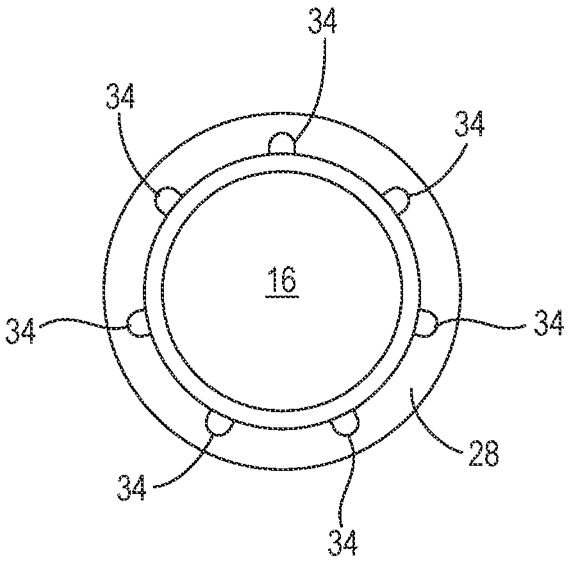
FIG. 7A is a top plan view of another embodiment of an injector cup.
Figure 7B:
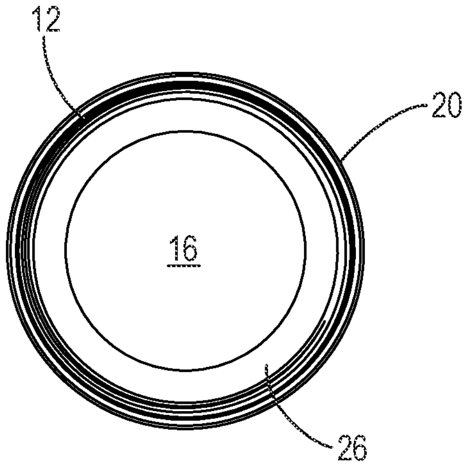
FIG. 7B is a bottom plan view of another embodiment of an injector cup.

Referring to FIGS. 5-7, and notably FIG. 5, an improved injector cup 10 may be designed more particularly for use in a SOHC engine. An improved injector cup 10 may include a barrel 12, and threads 26. An improved injector cup 10 may be described as having a proximal end and a distal end. The proximal end may include a rim 28, which rim 28 defines a proximal aperture 14. The distal end may include threads 26, which threads 26 define a distal aperture 16. An O-ring groove 18 may be included along the outside of the barrel 12 near the proximal end of the injector cup 10. More likely, two or more O-ring grooves 18 may be included along the outside of the barrel 12 near the proximal end of the injector cup 10.

Generally, an improved injector cup 10 may be made of stainless steel, but any suitable material may be used to form the injector cup 10. An O-ring may be a dual silicone O-ring, but any suitable material may be used to form an O-ring. An O-ring may be comprised of a material that can withstand temperatures of at least 450° F. Upon installation of an injector cup 10, each O-ring groove 18 that is on the barrel 12 will include a suitable O-ring within the O-ring groove 18.

Referring to FIGS. 5-7, and notably FIG. 6A, the barrel 12 of an injector cup 10 may be any suitable length. An overall length of the injector cup 10 should allow for all O-rings to connect with and seal with the bore of an injector cavity 52, or the injector cavity wall 54, in which the injector cup 10 is installed. An example of an overall length of the injector cup 10 would be 1.65 inches. An example of the length of the barrel 12 would be 0.97 inches. The injector cup 10 may have a barrel 12 that has a length that places all O-rings above the coolant chamber 56 and within the injector cavity bore 52 such that the O-ring nearest the coolant chamber 56 is at least 0.05 inches above the coolant chamber 56. An example of the outer diameter of the barrel 12, and rim 28, would be 1.38 inches. An example of the diameter of the proximal aperture 14 would be 1.06 inches. An example of the diameter of the distal aperture 16 would be 0.93 inches.

Referring to FIGS. 5-7, and notably FIG. 7A, an improved injector cup 10 may include a rim 28 of the injector cup 10. The rim 28 may include multiple cavities 34, or a plurality of cavities 34. The cavities 34 may be configured to receive prongs 78 from a torque tool 70. The cavities 34 may be arranged in any suitable configuration around the rim 28 to enable engagement with a suitable torque tool 70. An example of the inner diameter of the rim 28 would be 1.06 inches.

Figure 8:
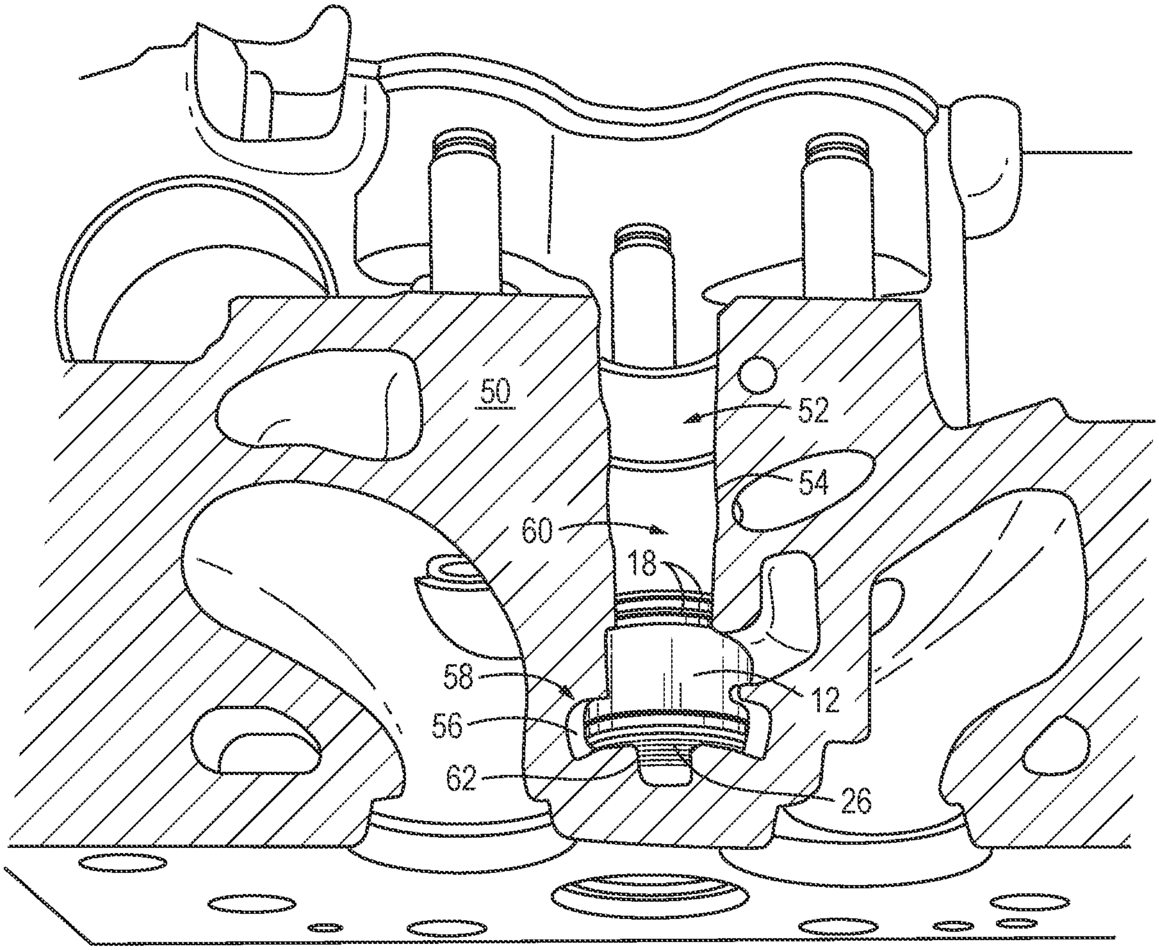
FIG. 8 is a perspective view of another embodiment of an injector cup as installed in a cylinder head.

Referring to FIG. 8, an improved injector cup 10 may be installed into a bore of an injector cavity 52 of a cylinder head 50, or engine 50. The injector cup 10 may be secured to the bottom of the cylinder head 62, or the cup seat 62, via the threads 26. The bottom of the cylinder head 62, or cup seat 62, may need to be tapped, or have an internal screw thread cut therein, to engage with the threads 26. Installation of the improved injector cup 10 may be accomplished using a torque tool 70 where the body 72 of the torque tool 70, and the tube 76 of the torque tool 70, may extend into the bore of an injector cavity 52 to allow the prongs 78 of the torque tool 70 to engage the cavities 34 of the injector cup 10. Once the prongs 78 are engaged with the cavities 34, the torque tool 70 can be used to tighten the injector cup 10 into place within the cylinder head 52.

Once the injector cup 10 is secured into place, O-rings positioned in O-ring grooves 18 will engage or contact the injector cavity wall 54. This will effectively seal the fuel side 60 of the configuration from the coolant side 58. Coolant in the coolant chamber 56 will be prevented from leaking into the fuel and/or fuel will be prevented from leaking into the coolant chamber 56.

Figure 9A:
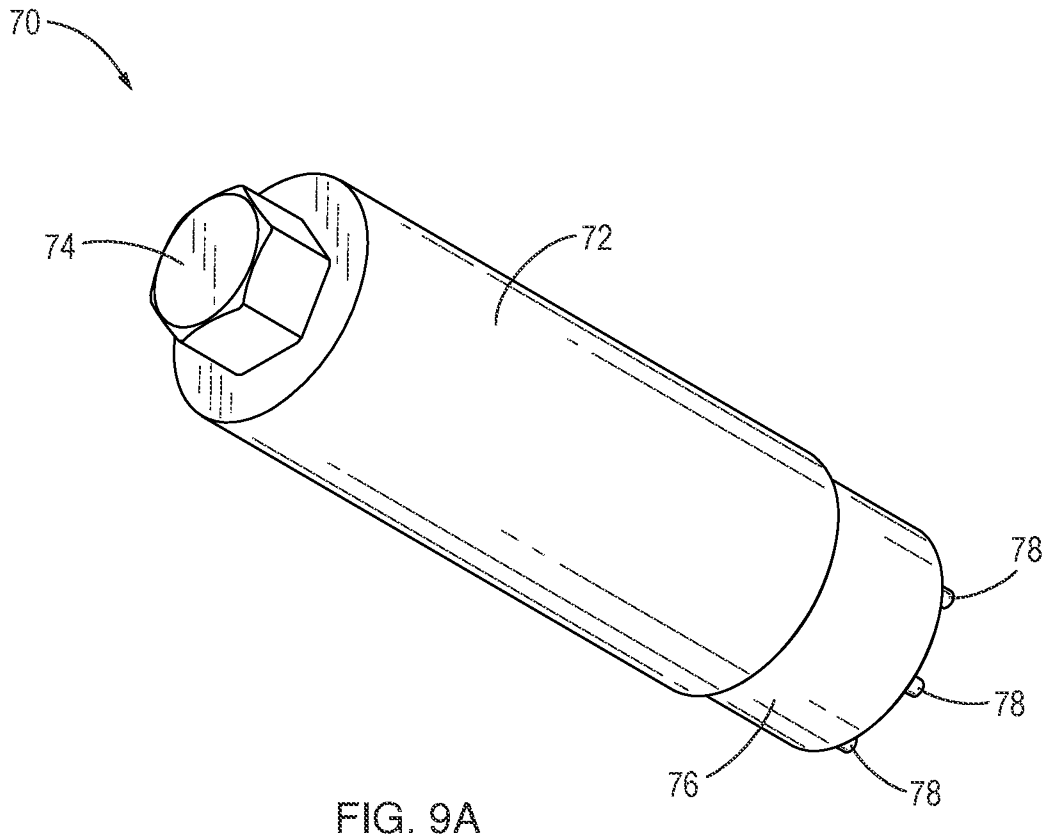
FIG. 9A is a perspective view of a torque tool.
Figure 9B:
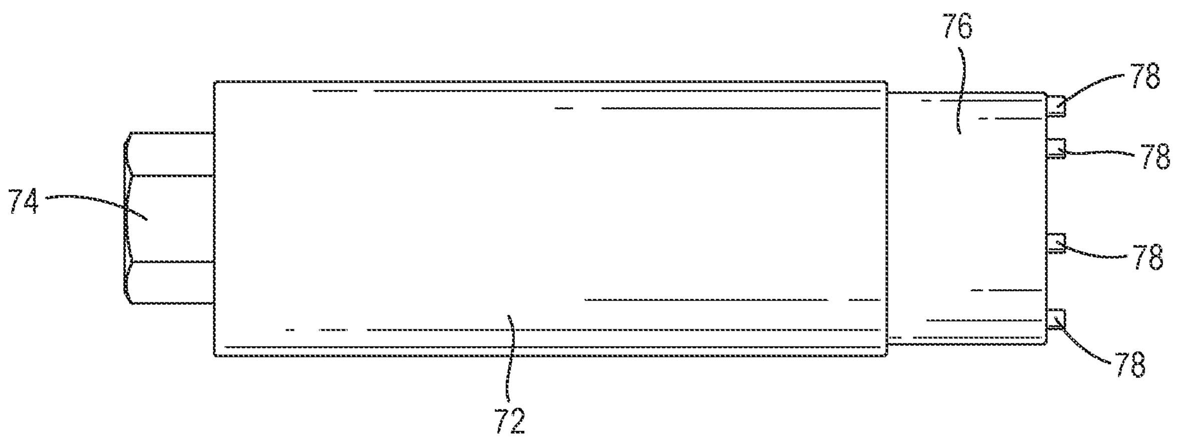
FIG. 9B is a side view of a torque tool.

Referring to FIG. 9, a torque tool 70 may be specially designed to engage and install an improved injector cup 10. The torque tool 70 may comprise a body 72 and a tube 76 that provide the majority of the length of the torque tool 70. One end of the torque tool 70 may include a bolt head 74 that may allow the torque tool 70 to be rotated using a wrench, a socket wrench, or similar tool. The opposite end of the torque tool 70 may include multiple prongs 78, or a plurality of prongs 78, to engage cavities 34 of the improved injector cup 10. A torque tool 70 may be configured in any suitable manner to allow use with one or more types of improved injector cups.

Generally, the torque tool 70 may be made of stainless steel, but any suitable material may be used to form the torque tool 70. The torque tool 70 may be of any suitable size and shape. An example of the overall length of the torque tool 70 would be 4.72 inches. An example of the length of the body 72 would be 3.38 inches. An example of the outside diameter of the body 72 would be 1.38 inches. An example of the length of a prong 78 would be 0.10 inches, and a cavity 34 may have a corresponding, accommodating depth.

The example dimensions included herein should be considered adjustable, and may be adjusted in a number of ways. The dimensions could be adjusted to accommodate a specific engine type and/or size. The ratio of the relative dimensions may or may not remain constant. The example dimensions may be considered as approximations to illustrate the dimensions.

An improved injector cup and associated method of installation may be utilized to address the problem of possible leakage of coolant into the fuel and/or fuel into the coolant of a diesel engine, and any similar issue with any similar engine. For example, any engine that may have an issue with coolant and/or fuel leaking past an injector cup, or similar structure, and allowing coolant into the fuel and/or fuel into the coolant may be considered a candidate for use of an improved injector cup and associated method of installation presented herein. Put another way, any engine with an injector cup that may or tends to "float" in the cylinder head during operation may benefit from the improved injector cup apparatus and installation methods described herein.

A method for installing an improved injector cup may include the following steps.

A first step may be to remove the factory injector cup. To perform this step, the engine may or may not have to be removed from the vehicle depending on the type of engine. For example, the engine may have to be removed to install an improved injector cup in a DOHC engine, but the engine may not have to be removed to install an improved injector cup in a SOHC engine.

A second step may be to cut threads into the bottom of the cylinder head 62, or the cup seat 62, so that an improved injector cup may be mounted in the bore of an injector cavity 52. This will allow the injector cavity 52 of the cylinder head 50 (typically made of cast iron) to glide along the outside of the improved injector cup (typically made of stainless steel).

A third step may be to lock down, or thread and tighten, an improved injector cup to the fire deck side of the cylinder. This will prevent the improved injector cup 10 from being able to "float" inside the cylinder head, in contrast to a factory injector cup. The improved injector cup may be installed in a manner that ensures that at least two O-rings at the top of the improved injector cup 10 are seated so as to seal in the portion of the injector cavity bore 52 before the injector cavity bore 52 begins to taper, or before the coolant chamber 56 begins.

Once the improved injector cup is installed in the cylinder head, a recession in the injector cup may still need to be cut. The recession allows for engagement with a plug. This may be accomplished using an Irontite™ tool, or any suitable, similar tool. A gauge may be used to measure a plug, or measure a cutter, and determine the depth of the recession needed in the improved injector cup, so that the injector will seat in the injector cup at the proper depth, or injector protrusion. The cutter tool goes into the improved injector cup and cuts the appropriate recession. The step of measuring and cutting the recession for the improved injector cup may be substantially similar to the same step for a factory injector cup.

If the head is surfaced, or serviced, the nearest portion of the improved injector cup can be surfaced, or shaved down, without diminishing the improved injector cup's ability to seal the coolant away from the fuel. However, this may not be necessary because the nearest portion of the improved injector cup will normally be approximately 50 thousandths of an inch below the surface of the head, and a normal surfacing of the head will only shave off approximately 4-10 thousandths of an inch.

It may be helpful to make any adjustments to the cylinder head while the engine is out and new, improved injector cups are being installed. This may include preventing any material or debris from getting into or staying in the cylinder head.

With certain types of engines, i.e., a SOHC engine, the installation of an improved injector cup may be accomplished while the engine is still on the vehicle, or truck. For a SOHC engine, one embodiment of an improved injector cup may be bigger and thicker because there is more room in the cylinder head. An improved injector cup may include bigger O-rings, including O-rings designed to withstand higher temperatures, i.e., 450° F.

The improved injector cups are designed to thread into the cylinder head creating a locking bond between the injector cup and the cylinder head. It is designed to address the issues arising from the fact that the factory injector cup is just a press fit into the cylinder head. The factory cup may become loose over time and can cause a coolant leak into the fuel system of the engine, or a fuel leak into the coolant system of the engine. The improved injector cups may also be engineered with a dual silicone O-ring, where each O-ring is approximately twice the size of the regular, single factory O-ring seal. This feature also allows the cylinder head to expand and contract keeping the seal between the cylinder head and injector cup intact.

In one embodiment, an improved injector cup may include threads on a distal end so as to allow more firm and secure attachment to a cylinder head. Such an improved injector cup may also include an increase in length to provide for at least one additional silicone O-ring, or an O-ring of any suitable size and material. Such an improved injector cup may be configured to be used with a DOHC engine.

In one embodiment, an improved injector cup may include threads on a distal end so as to allow more firm and secure attachment to a cylinder head. Such an improved injector cup may also include increased length and thickness to provide for at least one additional silicone O-ring, or an O-ring of any suitable size and material. Such an improved injector cup may be configured to be used with a SOHC engine.

The subject invention may be more easily comprehended by reference to the specific embodiments recited herein, which are representative of the invention. However, it must be understood that the specific embodiments are provided only for the purpose of illustration, and that the invention may be practiced in a manner separate from what is specifically illustrated without departing from its scope and spirit.

What is claimed and desired to be secured by United States Letters Patent is:

1. A method for preventing leakage of coolant in a diesel engine, comprising:
- providing an injector cup comprising a barrel having threads at a distal end and at least two O-rings near a proximal end, wherein the barrel does not include a conical portion;
- inserting the injector cup into an injector cavity bore of a cylinder head, wherein the cylinder head comprises insertion threads at the bottom of the cylinder head; and
- tightening the injector cup into the injector cavity bore via engagement between the insertion threads and the threads of the injector cup in a manner that prevents floating of the injector cup within the cylinder head and in a manner that enables the O-rings to engage an injector cavity wall.

2. The method of claim 1 further comprising:

creating a seal between the injector cavity bore and a coolant chamber, wherein the seal is created by the engagement of the O-rings with the injector cavity wall and the seal prevents leakage of coolant into the fuel and prevents leakage of fuel into the coolant.

3. The method of claim 2, further comprising:

cutting a recession into the injector cup.

4. The method of claim 1, wherein the injector cup further comprises a plurality of cavities near the proximal end and the tightening is performed using a torque tool comprising a plurality of prongs that engage the plurality of cavities.

5. The method of claim 4, wherein the injector cup further comprises a recession for engagement with a plug.

6. The method of claim 2, wherein the injector cup has a barrel that has a length that places all O-rings above the coolant chamber and within the injector cavity bore such that the O-ring nearest the coolant chamber is at least 0.05 inches above the coolant chamber.

7. The method of claim 4, wherein the tightening of the injector cup is done to achieve at least sixty-five (65) foot-pounds of torque.

8. The method of claim 1, wherein the injector cup is comprised of stainless steel.

9. The method of claim 6, wherein the O-rings can withstand a temperature of at least 450° F.

10. A method for installing an injector cup into a diesel engine, comprising:

providing an injector cup, wherein the injector cup comprises threads at a distal end, at least two O-rings near a proximal end, and a barrel having a consistent diameter;

inserting the injector cup into an injector cavity bore of a cylinder head, wherein the cylinder head comprises insertion threads at the bottom of the cylinder head;

tightening the injector cup into the injector cavity bore via engagement between the insertion threads and the threads of the injector cup in a manner that prevents floating of the injector cup within the cylinder head and in a manner that enables the O-rings to engage an injector cavity wall;

creating a seal between the injector cavity bore and a coolant chamber, wherein the seal is created by the engagement of the O-rings with the injector cavity wall and the seal prevents leakage of coolant in the fuel of the diesel engine and prevents leakage of fuel into the coolant of the diesel engine and;

cutting a recession into the injector cup.

11. The method of claim 10, wherein the injector cup further comprises a plurality of cavities near the proximal end and the tightening is accomplished using a torque tool comprising a plurality of prongs that engage the plurality of cavities.

12. The method of claim 10, wherein the O-rings can withstand a temperature of at least 450° F.

13. The method of claim 11, wherein the tightening of the injector cup is done to achieve approximately sixty-five (65) foot-pounds of torque.

14. The method of claim 10, wherein the injector cup is comprised of stainless steel.

15. A method for preventing leakage past an injector cup of a diesel engine, comprising:

providing an injector cup, wherein the injector cup comprises a barrel having threads at a distal end, at least two O-rings near a proximal end, and a plurality of cavities near the proximal end of the injector cup, wherein the barrel does not have a conical portion;

inserting the injector cup into an injector cavity bore of a cylinder head, wherein the cylinder head comprises insertion threads in a fire deck side of the cylinder head;

providing a torque tool having a plurality of prongs at one end, wherein the plurality of prongs are configured to engage the plurality of cavities in the injector cup;

inserting the plurality of prongs into the plurality of cavities;

engaging, properly, the threads of the injector cup with the insertion threads;

tightening the injector cup into the fire deck side of the cylinder head via the engagement between the insertion threads and the threads of the injector cup in a manner that prevents floating of the injector cup within the cylinder head and in a manner that enables the O-rings to engage an injector cavity wall.

16. The method of claim 15, further comprising:

creating a seal between the injector cavity bore and a coolant chamber, wherein the seal is created by the engagement of the O-rings with the injector cavity wall; and cutting a recession into the injector cup.

17. The method of claim 15, wherein the tightening of the injector cup is done to achieve approximately sixty-five (65) foot-pounds of torque.

18. The method of claim 17, wherein the injector cup has a barrel that has a length that places all O-rings above the coolant chamber and within the injector cavity bore such that the O-ring nearest the coolant chamber is at least 0.05 inches above the coolant chamber.

* * * * *